G. FROWEN.
JOURNAL BOX.
APPLICATION FILED AUG. 25, 1908.
938,841. Patented Nov. 2, 1909.
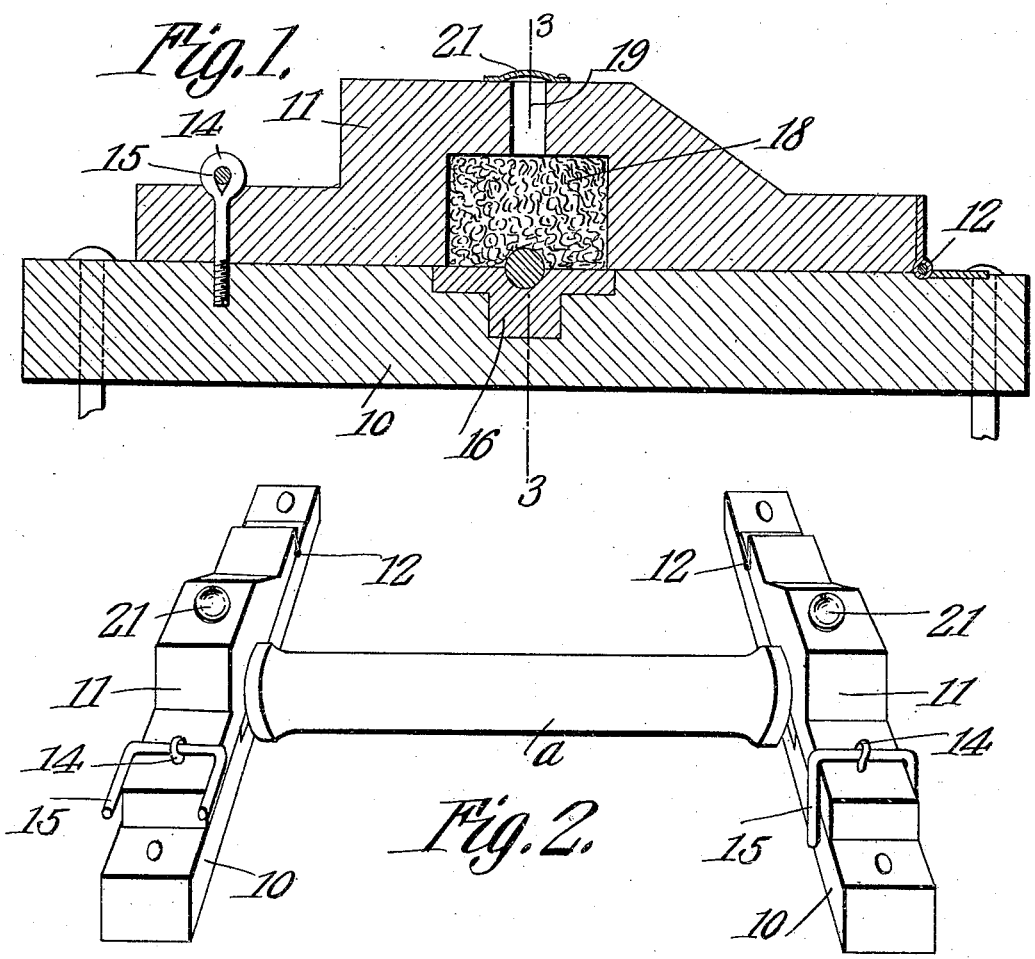
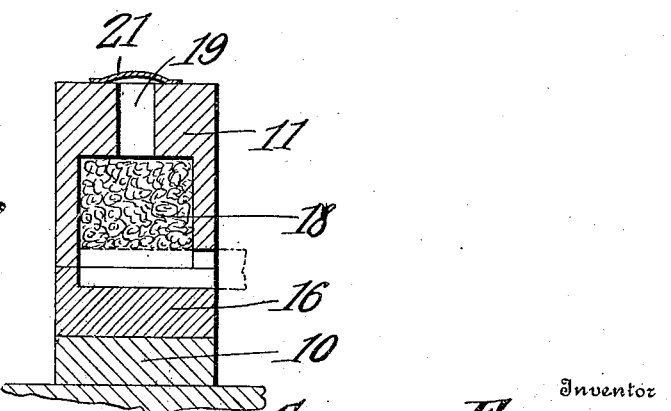

UNITED STATES PATENT OFFICE.

GEORGE FROWEN, OF PLEASANT UNITY, PENNSYLVANIA.

JOURNAL-BOX.

938,841.  Specification of Letters Patent.  Patented Nov. 2, 1909.

Application filed August 25, 1908.  Serial No. 450,178.

*To all whom it may concern:*

Be it known that I, GEORGE FROWEN, a citizen of the United States, residing at Pleasant Unity, in the county of Westmoreland and State of Pennsylvania, have invented a new and useful Journal-Box, of which the following is a specification.

The principal object of the present invention is to provide a novel form of journal bearing for use in connection with the rope guides or supports used in mines and similar places, where the hauling rope runs along between the rails sometimes for a distance of a mile or more, and where anti-friction rollers must be used for its support.

A further object of the invention is to provide a journal box in which the journal is entirely inclosed and protected with a view of excluding dust and dirt, and in which a sufficient quantity of lubricant may be inserted to last for a long period of time.

A still further object of the invention is to provide a journal box that may be readily opened for the removal of damaged or worn out rollers.

With these and other objects in view, as will more fully hereinafter appear, the invention consists in certain novel features of construction and arrangement of parts, more fully hereinafter described, illustrated in the accompanying drawings, and more particularly pointed out in the appended claim, it being understood that various changes in the form, proportion, size and minor details of the structure may be made without departing from the spirit or sacrificing any of the advantages of the invention.

In the accompanying drawings:—Figure 1 is a longitudinal sectional view of a journal bearing constructed in accordance with the invention. Fig. 2 is a detail perspective view showing a pair of bearings, and a roll supported between them. Fig. 3 is a transverse section on the line 3—3 of Fig. 1.

Similar numerals of reference are employed to indicate corresponding parts throughout the several figures of the drawings.

The body of the bearing comprises a pillow block 10 and a cap 11, these two members being connected together at one end by a hinge 12 and the opposite end portion of the cap having a vertical opening for the passage of a securing element in the nature of an eye bolt 14 that is inserted through the opening in the cap and threaded into the pillow block for the purpose of securing the cap in position against or upon the upper face of the pillow block. There is associated with the securing eye bolt a combined locking member and wrench which is in the nature of a U-shaped bail having its intermediate portion engaged through the eye of the securing bolt whereby it is pivotally connected with the bolt. When the bail is swung to such position that its spaced portions will extend vertically above the cap, they may be grasped and the eye bolt may be rotated either to thread it into the pillow block whereby to secure the cap against the upper face thereof or to unthread the said bolt and, on the other hand, when the eye bolt has been threaded into the block to a degree sufficient to firmly lock the cap in place, the bail may be swung down with its spaced portions lying one to each side of the cap and pillow block, rotation of the eye bolt being in this manner effectually prevented.

The central portion of the pillow block is provided with a recess for the reception of a brass or other bearing block 16 having a central recess of the proper shape to receive the journal at the end of the roller *a*. This recess terminates short of the outer edge of the block so that the end of the journal will be wholly inclosed, and the entrance of dust and dirt prevented.

The cap is hollow and has a filling 18 formed of cotton waste or the like which may be saturated with oil or other lubricating material introduced through an opening 19 near the top of the cap. This opening is normally closed by a swinging plate 21 in order to prevent the entrance of dirt.

It is found in practice that sufficient lubricant may be applied to the box to keep the journal properly oiled for six or seven days, whereas with the ordinary boxes it is necessary that fresh lubricant be applied at least once each day.

What is claimed is:—

In a journal box, a pillow block, a cap block having one end pivotally connected with the pillow block, an eye-bolt threaded through the cap block and the end of the pillow block whereby to secure the cap block upon the pillow block, and a U-shaped bail having a connecting portion engaged through the eye of the bolt and having its spaced portions spaced apart a distance equal to the width of the block whereby the bail may be swung downwardly with its spaced portions lying one to each side of the pillow and cap block to hold the same against displacement, and to hold the bolt against rotation, said spaced portions, when moved to position to extend upwardly, serving as handles whereby the bolt may be rotated.

In testimony that I claim the foregoing as my own, I have hereto affixed my signature in the presence of two witnesses.

GEORGE FROWEN.

Witnesses.
GEORGE HEGAN,
JOHN STEIN.